Patented Oct. 4, 1932

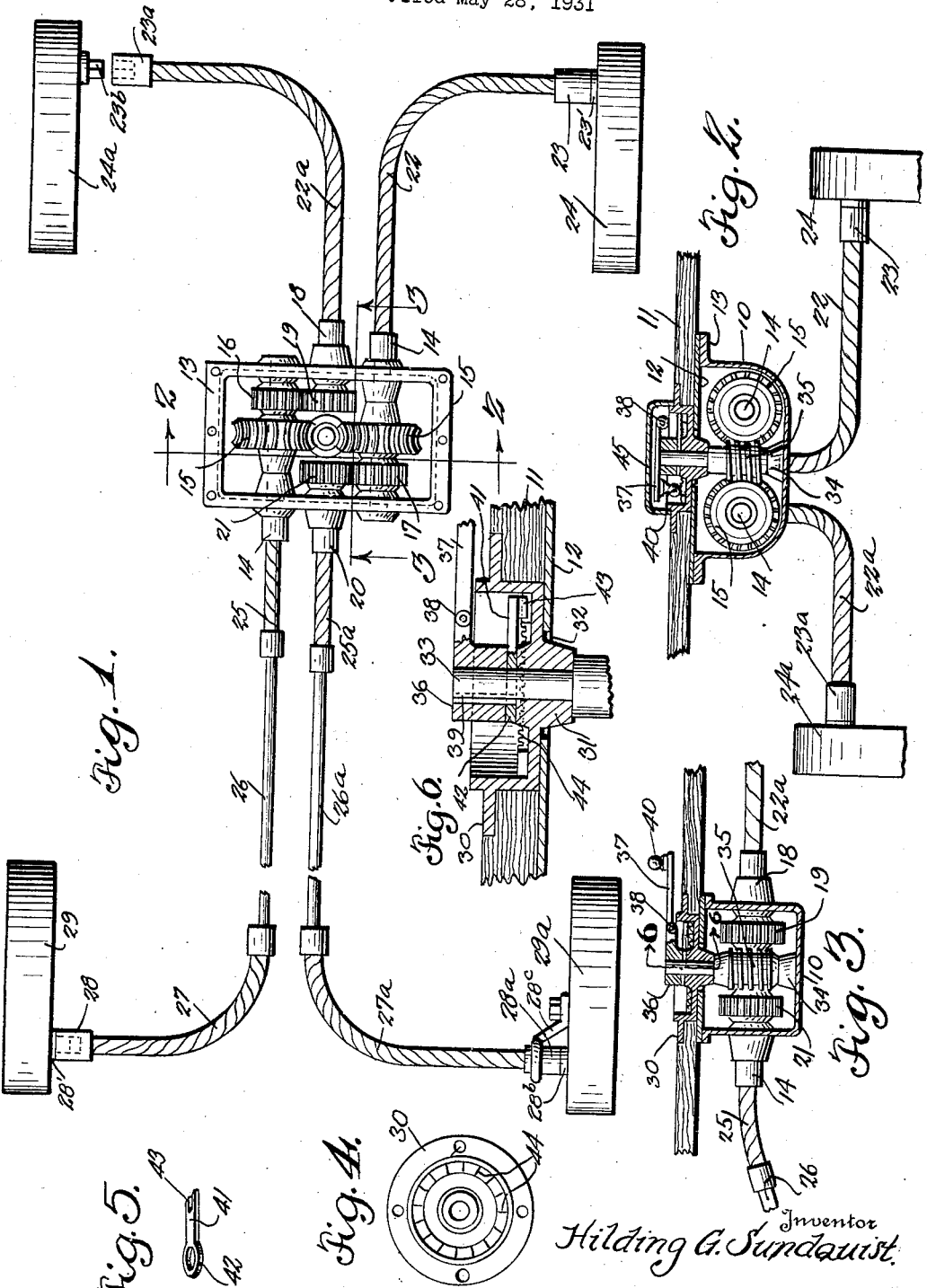

1,880,368

UNITED STATES PATENT OFFICE

HILDING G. SUNDQUIST, OF SPRINGFIELD, MASSACHUSETTS, ASSIGNOR OF ONE-FOURTH TO JAN P. CLARY, OF HARTFORD, CONNECTICUT

MOTOR VEHICLE BRAKE ADJUSTING MECHANISM

Application filed May 28, 1931. Serial No. 540,714.

This invention relates to certain new and useful improvements in motor vehicle brake adjusting mechanism.

The primary object of the invention is to provide motor vehicle brake adjusting mechanism for accomplishing simultaneous adjustment of four wheel brake devices by the use of a single operating lever, the mechanism comprising a gear box having operative connections with the four wheels of the motor vehicle and preferably supported beneath the floor board with the operating lever for the mechanism in the gear box accessible from a point above the floor board.

With the above and other objects in view that will become apparent as the nature of the invention is better understood, the same consists in the novel form, combination and arrangement of parts hereinafter more fully described, shown in the accompanying drawing and claimed.

In the drawing:—

Figure 1 is a top plan view of the brake adjusting mechanism showing the gear box and the flexible shaft connections between the mechanism in the gear box and the brake adjusting devices associated with the brake shoes and brake drums;

Figure 2 is a cross-sectional view taken on line 2—2 of Figure 1, showing the gear box supported beneath the floor boards of the automobile with the operating lever for the gear mechanism arranged at the upper side of the floor board and beneath a removable cover;

Figure 3 is a fragmentary longitudinal sectional view taken on line 3—3 of Figure 1, showing the operating lever in its extended operative position;

Figure 4 is a top plan view of the toothed ring and casting for holding the manually shiftable lever in adjusted position;

Figure 5 is a perspective view of the ratchet key engageable with the toothed ring; and Figure 6 is an enlarged detail sectional view taken on line 6—6 of Figure 3.

The present invention includes manually operated devices associated with the brake shoes of a motor vehicle brake mechanism, a four wheel brake mechanism being illustrated, and said devices include a gear box 10 secured in any convenient manner to the underside of the floor board 11 of the automobile in proximity of the driver's seat, the open upperside of the casing being closed by a plate 12 extending over the edge flange 13 of the gear box and there secured together with the gear box to the floor board 11. The gear box 10 has a pair of spaced parallel shafts 14 journalled therein and extending longitudinally of the motor vehicle, one adjacent each end of the gear box, each shaft 14 having a worm wheel 15 fixed thereto intermediate its ends, the forward end of one shaft 14 having a gear wheel 16 keyed thereto while the rear end of the other shaft 14 has a gear wheel 17 keyed thereto. A stub shaft 18 journalled in the forward side of the gear box 10 has a gear wheel 19 fixed to its inner end that meshes with the gear wheel 16, while a second stub shaft 20 journalled in the rear wall of the gear box has a gear wheel 21 fixed thereto that meshes with the gear wheel 17.

The forward end of one shaft 14 as illustrated in Figure 1, has a flexible shaft connection 22 with a wrench member 23 that is engaged with a brake adjusting device 23' associated with the brake drum 24, while another flexible shaft 22a connected to the stub shaft 18 has the connection 23a, illustrated as separated from the brake adjusting device 23b in the brake drum 24a. The rear end of the other shaft 14 carries a relatively flexible shaft 25 engaged with a rigid shaft 26, the extreme rear end of which has a flexible shaft connection 27 with the wrench member 28 that is engaged with a brake adjusting device 28' in the brake drum 29. The rear projecting end of the stub shaft 20 has a relatively short flexible shaft connection 25a with a relatively long rigid shaft 26a and to the rear end of the shaft 26a, there is connected a flexible shaft 27a with a wrench member 28a engaged with a brake adjusting device 28b within the brake drum 29a. The several wrench members are retained in engagement with the brake adjusting devices in any convenient manner, such as by set screws or bracket arms, one of which bracket arms is illustrated at 28c in Figure 1.

The operating mechanism for the gear devices and the shaft connections with the brake adjusting mechanism includes a dished ring casting 30 set into a cavity in the floor 11 directly above the gear box 10, the ring casting carrying a central bearing 31 having a portion depending through a central opening 32 in the plate 12 and in which bearing a stub shaft 33 is vertically journalled with an end thrust bearing 34 for the lower end thereof upon the bottom wall of the gear box. The shaft 33 carries a worm 35 disposed between the two worm wheels 15 and meshing with the same so that when the worm 35 is rotated, motion is imparted to the worm wheels 15 and gears associated therewith.

The operating devices for the stub shaft 33 include a handle or lever comprising two parts 36 and 37 hinged together as at 38, the part 36 being keyed as at 39 to the shaft 33, the outer end of the lever section 37 carrying a knob 40 to facilitate operation thereof. A latch key 41 as shown in Figures 5 and 6 has a ring portion 42 at one end thereof that surrounds and is keyed upon the shaft 33 beneath the lever section 36 with a ratchet lug 43 depending from its other end for engagement with the circular series of teeth 44 upon the bottom wall of the ring casting 30 as illustrated. In the normal position of the lever, the same is folded upon its hinged connection 38 to be disposed within the ring casting 30 as illustrated in Figure 2 and said lever is covered by a removable cap plate 45.

When it is desired to adjust the brake mechanism of the motor vehicle, the cap plate 45 is removed and the lever extended by moving the outer section 37 upon its hinged connection 38 with the inner section 36 and by operating the lever 37, rotation is imparted to the stub shaft 33 and worm 35 for operating the worm wheels 15 and gear wheels associated therewith, this rotary motion being imparted to the flexible shafts 22, 22a and 27, 27a that are engaged with brake adjusting devices 23, 23a and 28, 28a, all four brakes being simultaneously adjusted. The ratchet key 41 retains the operating lever in its adjusted position by having the lugs 43 thereof engaged with the teeth 44 upon the ring casting 30 and the control lever may be shifted in either direction to tighten or loosen the brake mechanism.

From the above detailed description of the invention, it is believed that the construction and operation thereof will at once be apparent and while there is herein shown and described the preferred embodiment of the present invention, it is nevertheless to be understood that minor changes may be made therein without departing from the spirit and scope of the invention as claimed.

I claim:—

1. In vehicle brake adjusting mechanism, a gear box supported on a motor vehicle and flexible shaft connections between the gear box and the vehicle brake adjusting devices.

2. In vehicle brake adjusting mechanism, a gear box supported on a motor vehicle and flexible shaft connections between the gear box and the vehicle brake adjusting devices, and a lever for operating the mechanism in the gear box.

3. In vehicle brake adjusting mechanism, a gear box supported on a motor vehicle and flexible shaft connections between the gear box and the vehicle brake adjusting devices, the mechanism in the gear box including a worm shaft projecting from the gear box and a lever fixed to the projecting end of the worm shaft.

4. In vehicle brake adjusting mechanism, a gear box supported on a motor vehicle and flexible shaft connections between the gear box and the vehicle brake adjusting devices, the mechanism in the gear box including a worm shaft projecting from the gear box, a lever fixed to the projecting end of the worm shaft, and carrying a hinged outer end to be folded inwardly over the shaft, and a removable closure cap for the lever.

5. In vehicle brake adjusting mechanism, a gear box supported on a motor vehicle and flexible shaft connections between the gear box and the vehicle brake adjusting devices, the mechanism in the gear box including a worm shaft projecting from the gear box and a lever fixed to the projecting end of the worm shaft, a ring casting having a circular series of teeth and through which the worm shaft extends, and a latch key fixed to the shaft and engaged with the teeth for holding the shaft and lever in adjusted positions.

6. In vehicle brake adjusting mechanism, a gear box supported on a motor vehicle and flexible shaft connections between the gear box and the vehicle brake adjusting devices, the mechanism in the gear box including a worm shaft projecting from the gear box, a lever fixed to the projecting end of the worm shaft, carrying a hinged outer end to be folded inwardly over the shaft and a removable closure cap for the lever, a ring casting having a circular series of teeth and through which the worm shaft extends and a latch key fixed to the shaft and engaged with the teeth for holding the shaft and lever in adjusted positions.

7. The combination with a motor vehicle equipped with four-wheel brakes, of adjusting mechanism for the brakes including gear mechanism supported on the vehicle and flexible shaft connections between the gear mechanisms and the brake adjusting devices directly associated with the four wheels.

8. The combination with a motor vehicle equipped with four-wheel brakes, of adjusting mechanism for the brakes including gear mechanism supported on the vehicle and flexible shaft connections between the gear mechanism and the brake adjusting devices directly associated with the four wheels, and a single lever for operating the gear mechanism for simultaneous adjustments of the brakes.

In testimony whereof I affix my signature.

HILDING G. SUNDQUIST.